United States Patent [19]

Washington

[11] Patent Number: 4,523,704
[45] Date of Patent: Jun. 18, 1985

[54] CAR TOP ROD AND REEL CARRIER APPARATUS

[76] Inventor: Leonard Washington, 225 Brunswick Ave., Trenton, N.J. 08618

[21] Appl. No.: 564,508

[22] Filed: Dec. 22, 1983

[51] Int. Cl.³ .................. B60R 9/04; A01K 97/08
[52] U.S. Cl. ...................................... 224/328; 43/26;
                                                    224/329; 224/922
[58] Field of Search ............. 224/328, 322, 323, 922;
                                                    43/26

[56] References Cited

U.S. PATENT DOCUMENTS

| | | |
|---|---|---|
| 2,171,053 | 8/1939 | White et al. . |
| 2,682,982 | 7/1954 | Fischer, Jr. . |
| 2,788,928 | 4/1957 | Des Fosses . |
| 2,807,398 | 9/1957 | Mathews . |
| 2,907,506 | 10/1959 | Sammons . |
| 3,204,362 | 9/1965 | Andrews . |
| 3,349,512 | 10/1967 | Walker ................................. 43/26 |
| 3,524,572 | 8/1970 | Hall ............................... 224/323 X |
| 3,662,933 | 5/1972 | Michal . |
| 3,674,910 | 7/1972 | Wright ............................. 43/26 X |
| 3,917,137 | 11/1975 | Wilkins ........................ 224/917 X |
| 3,972,144 | 8/1976 | Geisler ................................ 43/26 |
| 4,071,176 | 1/1978 | Tuzee . |
| 4,170,801 | 10/1979 | Ward . |
| 4,274,568 | 6/1981 | Bott . |
| 4,274,571 | 6/1981 | Lafreniere et al. ............. 224/917 X |
| 4,311,262 | 1/1982 | Morin . |
| 4,326,655 | 4/1982 | Gradek et al. ................. 224/322 X |
| 4,335,840 | 6/1982 | Williams . |
| 4,359,161 | 11/1982 | Sinoff . |
| 4,372,470 | 2/1983 | Dallaire . |
| 4,446,900 | 5/1984 | Markovich ..................... 224/913 X |

FOREIGN PATENT DOCUMENTS 2910895  10/1980  Fed. Rep. of Germany ...... 224/328
2051564  1/1981  United Kingdom ................ 224/922

Primary Examiner—Stephen Marcus
Assistant Examiner—Robert Petrik
Attorney, Agent, or Firm—Richard C. Woodbridge

[57] ABSTRACT

A car top rod and reel carrier permits the user to store rods and reels in their assembled state ready for fishing. The apparatus includes a handle so that the carrier including the rods and reels can be carried as a unit. The apparatus also includes a top section connected by hinges to a bottom section. Semi-circular cut outs in the front and rear edges of the top and bottom sections create coaxial apertures for the fishing equipment. The rod portion passes through the first set of front apertures and the butt portion of the rod and reel combination passes through the second set of rear apertures. A cushion inside of the bottom section supports the reels. The apparatus is attached to the top of an automobile by means of adjustable gutter mounts. The device permits the user to store rods and reels in the "ready to go" state. Moreover, the entire unit may be removed from the automobile and carried to the fishing site conveniently.

4 Claims, 4 Drawing Figures 4,523,704

CAR TOP ROD AND REEL CARRIER APPARATUS

BACKGROUND OF THE INVENTION

1. Field of the Invention

This invention relates to an apparatus for carrying rods and reels on the top of a car and which may be separated from the car for carrying purposes.

2. Description of the Prior Art

There are devices known in the prior art for carrying fishing rods and the like. For example, U.S. Pat. No. 4,335,840 discloses a carrier in which fishing rods protrude from inside of the devices. However, the carrier is not structured for easy separation from the car, nor does it appear to be economical and easy to carry around.

There also exist several devices for carrying rods and reels, but not for attaching them to an automobile. See for example, U.S. Pat. No. 4,311,262 and 3,674,190.

There are several ways of attaching carriers of equipment to the top of a car. Gutter clamps are disclosed, for example, in U.S. Pat. No. 2,907,506 and 4,372,470.

There are also devices known in the prior art for carrying other types of apparatus. Note for example, U.S. Pat. No. 4,071,176 which is directed towards the carrying of skis.

Finally, there are a number of other patents which are of interest but of less distinct relevance, including U.S. Pat. No. 2,171,053; 2,682,982; 2,788,928; 2,807,398; 3,204,362; and 4,170,801.

Insofar as understood, none of the prior art known to the Inventor or cited above provides for a car top rod and reel carrier of economical structure which can be easily separated from the roof top for carrying to a fishing site. In particular, in combination with the foregoing, none of the prior art devices appear to economically allow the rods and reels to be carried in their assembled state so that the fisherman is "ready to go" when he reaches his ultimate fishing destination.

SUMMARY OF THE INVENTION

Briefly described the invention comprises a car top rod and reel carrier which may be separated from the car top and carried as a portable unit to the ultimate fishing site. The carrier is also constructed so that the fishing equipment can be carried completely assembled so that the fisherman is ready to fish when the rods and reels are unpacked. The carrier comprises a top section and a bottom section connected together by hinges along one edge. A handle is connected to the bottom section to make the unit portable and a lock mechanism is attached to the top section to lock the top and bottom sections securely together. A plurality of front apertures are formed at the juncture of the front portion of the top and bottom sections. Similarly, a plurality of rear apertures are formed at the rear juncture of the top and bottom sections. The front and rear apertures are coaxial with each other so that a fishing rod can be placed in the carrier with the butt passing out of the rear aperture and the front portion passing out of the front aperture therefore leaving the reel and tackle craddled in the interior of the carrier. A soft cushion rests in the bottom section and is contoured to craddle the reel assembly. Resilient rubberized feet form a cushion between the roof of a car and the bottom section of the carrier unit. A pair of adjustable roof fasteners are attached to the carrier unit to the roof gutter of the automobile.

Prior to use the fishing rod is set up so that the fisherman is prepared to go fishing. The carrier is opened and the butt of the rod is placed through the rear aperture leaving the front of the rod to pass through the front aperture. The top and bottom sections are then locked securing the reel mechanism safely in the interior of the carrier. The carrier is then attached to the car by a pair of adjustable gutter mounts. The butt end of the rod preferably faces forward during transportation.

When the fisherman reaches his parking place he unlatches the gutter mounts and carries the unit, rod, reels and all, to the fishing location. The carrier protects the rod and reel until the equipment is ready for use. For example, the carrier can be carried directly on board a boat and stored in that fashion until the fisherman is ready to fish.

These and other features of the invention will be more fully understood by reference to the following drawings.

DETAILED DESCRIPTION OF THE PREFERRED EMBODIMENT

During the course of this description like numbers will be used to indicate like elements according to the different views which illustrate the invention.

Figure 1:
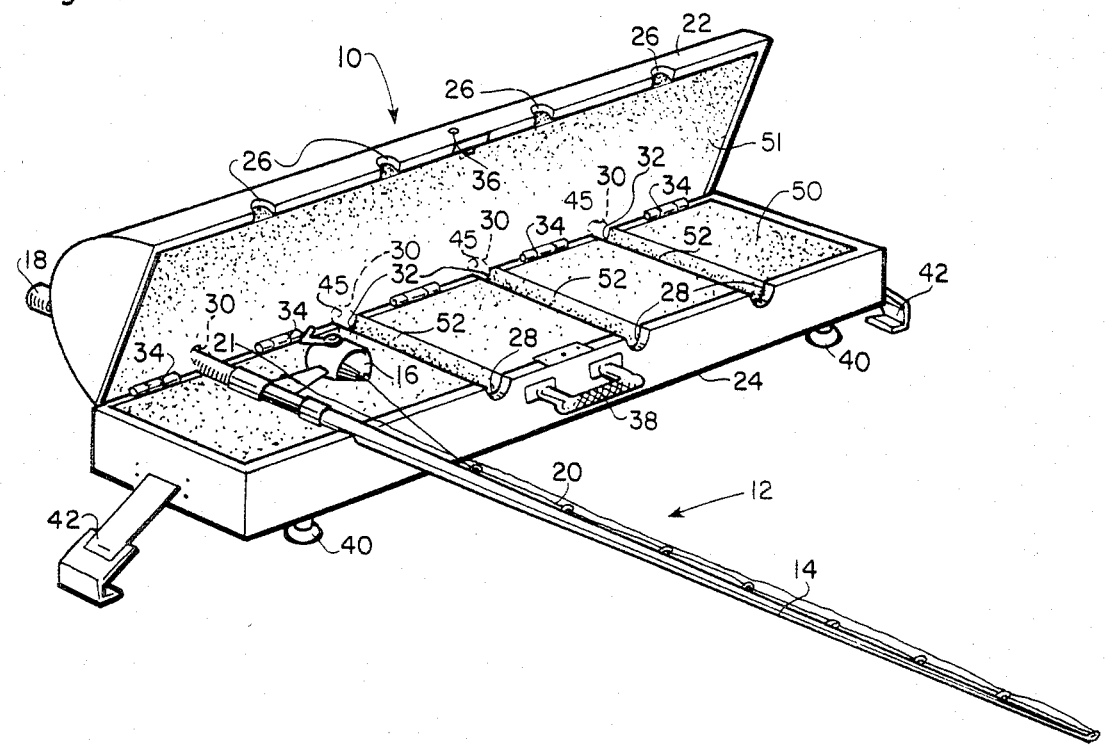
FIG. 1 is a perspective view of the preferred embodiment of the invention with the carrier shown in the open position.

The preferred embodiment of the carrier 10 is illustrated in FIG. 1. The carrier 10 is constructed to accomodate a conventional fishing rod 12 including at least a top portion 14, a reel portion 16, a butt or handle portion 18 and a length of line 20. A hook or other tackle 21 may be attached to the end of the line.

The carrier 10 includes a top section 22 connected to a bottom section 24 by a plurality of hinges 34 along the rear edge of the carrier 10. A lock mechanism, 36 is employed to secure the front portions of the top and bottom sections 22 and 24 respectively together. A handle 38 is attached to the bottom section 24 and is used to carry the unit when it is not mounted on an automobile 46. At least four adjustable, resilient suction cup feet 40 are attached at the four corners of the bottom section 24 to cushion the ride of the carrier apparatus during transportation. Suction feet 40 also improve the attractive force between the carrier 10 and the roof of the automobile 48. A pair of adjustable roof fasteners 42 are attached at opposite ends of the bottom section 24. The roof fasteners 42 include a curved portion which is adapted to engage the rain gutter 48 along the edge of the roof of conventional automobile 46. The structure of roof fasteners 42 is believed to be conventional and therefore no further description is required. Fasteners of this sort are known to be used for baggage carriers and a description of some typical attachment devices may be found in the Fall 1981 Montgomery Ward Catalog.

The front of the top section 22 includes a plurality of semi-circular cut outs 26 which match with a plurality of semi-circular cut outs 28 in the bottom section 24.

The semi-circular cut outs 26 and 28 form a plurality of apertures 44 which accomodate the top portion 14 of fishing rod 12. Similarly, a set of rear apertures 45 is formed by semi-circular cut outs 30 in the rear portion of top section 22 and by semi-circular cut outs 32 in the rear portion of bottom section 24. Front apertures 44 and rear apertures 45 are coaxial so that the butt 18 of fishing rod 12 passes through the rear aperture 45 while the top portion 14 of the rod 12 passes through the front aperture 44.

A pad 50 is located in the bottom section 24 of the carrier unit 10. A plurality of grooves 52 connect the front apertures 44 to the rear apertures 45 in such a way as to cradle the reel 16 of the rod 12. The grooves 52 may be contoured to have a geometry complimentary to the rod and reel section captured between the top and bottom sections 22 and 24 of the carrier unit 10.

Figure 2:
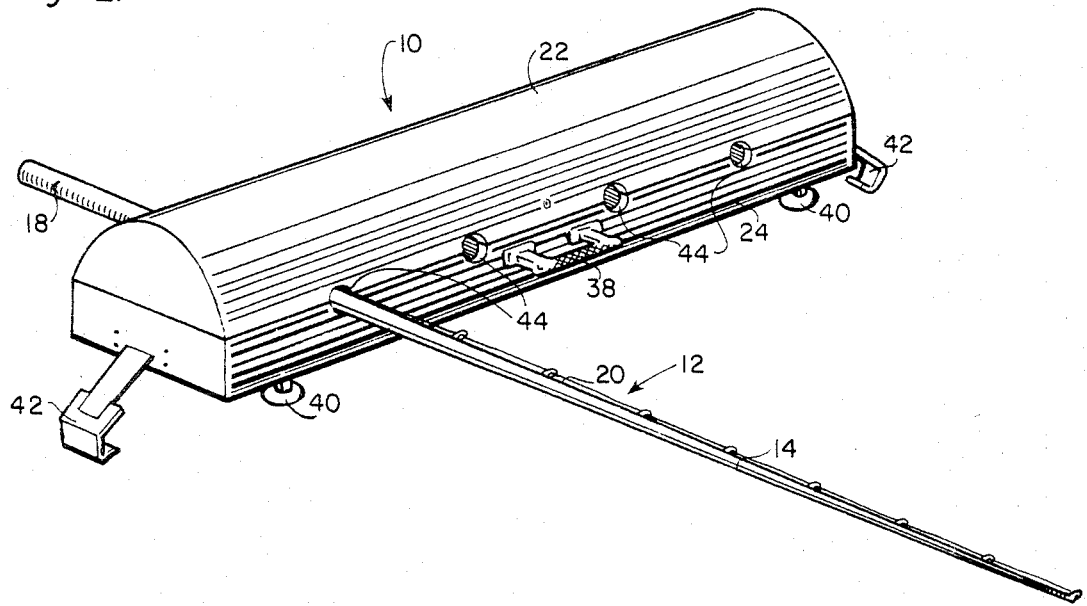
FIG. 2 is a perspective view of the preferred embodiment of the carrier shown in the closed position.
Figure 3:
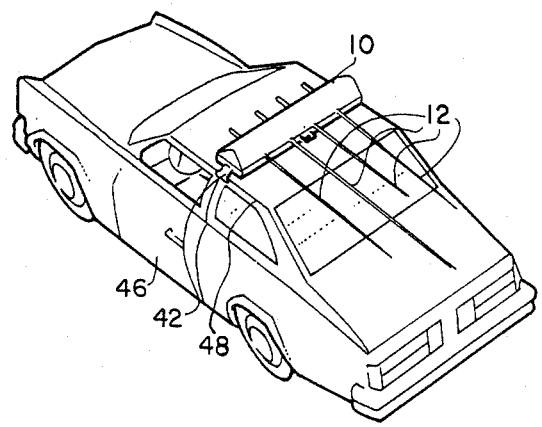
FIG. 3 illustrates the manner in which the carrier is attached to the top of an automobile.
Figure 4:
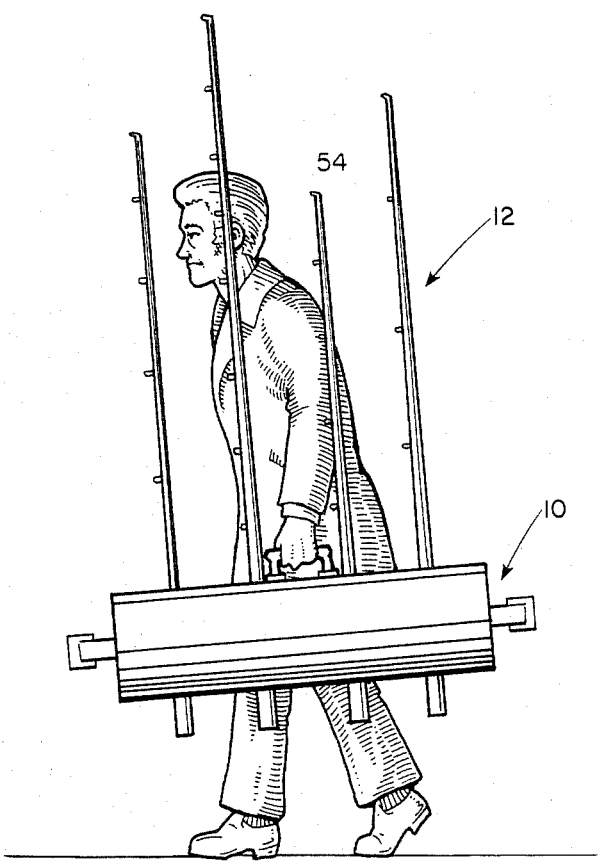
FIG. 4 illustrates the manner in which the carrier may be transported by an individual.

Prior to using the device a fisherman 54 would set up his fishing apparatus complete with hook and tackle 21 so that he is ready to go fishing. As many rods 12 are placed in the carrier unit 10 as the unit will take. The unit 10 illustrated in FIGS. 1 and 2 is designed to carry a maximum of rour rods. However, fewer than four rods could be carried or, alternatively, the unit could be made to accomodate more than four rods if additional apertures 44 and 45 are provided therein. Once the rods 12 are in position the top section 22 is locked to the bottom section 24 by means of conventional locking mechanism 36. The carrier unit 10 is then placed on top of automobile 46 and the roof fasteners 42 are attached to the rain gutters 48 in a manner known to those of ordinary skill in the art. Suction feet 40 and fasteners 42 keep the carrier unit 10 firmly attached to the roof of the car during transportation.

Once the fisherman 54 gets to his parking destination he unattaches fasteners 42 and physically carries the unit 10, rods 12 and all by handle 38 to his boat or fishing place. The unit 10 may be carried onboard a boat and stored in that manner until the fisherman 54 is at the desired fishing location. At that point the unit 10 is unlocked and the fisherman is ready to fish.

The invention just described has several major advantages. First, the carrier 10 does double duty in the sense that it acts as both a roof top carrier and as a caddy for transporting the fishing equipment 12. Second, the fishing equipment 12 may be set up with line, hook and tackle 12 so that the fisherman 54 is immediately ready to go fishing once he reaches his ultimate destination. Third, the device is relatively easy to construct and operate. Fourth, the invention can be made almost entirely of modern high impact plastics, thereby keeping the costs down and minimizing the possibility of corrosion.

The figures illustrate a carrier constructed to carry four fishing rods 12. The carrier 10 however, could carry fewer than four rods, or, if the carrier were so designed, could carry more than four rods. The materials of the top and bottom sections 22 and 24 preferably comprise a high impact plastic. However, other materials might be used as well, such as light weight aluminum. Roof fasteners 42 and foot sections 40 are of conventional design. Other types of resilient feet 40 and roof fasteners 42 could be employed to achieve the same effect.

While the invention has been described with reference to the preferred embodiment thereof, it will be appreciated by those of ordinary skill in the art that various modifications may be made to the components that form the invention without departing from the spirit and scope thereof.

I claim:

1. A car top carrier apparatus for carrying assembled rod and reel combinations, said apparatus comprising:
   a top section;
   a bottom section;
   hinge means for attaching said top and bottom sections together, said top and bottom sections forming the shell of carrier apparatus, said carrier apparatus having relatively long front and rear portions and relatively short side portions;
   a first plurality of cut-out sections located along the front portion of said top section;
   a first plurality of cut-out sections located along the front portion of said bottom section such that said first plurality of front cut-out sections in said top and bottom sections mate to form a first set of aperture means;
   a second plurality of cut-out sections located along the rear portion of said top section;
   a second plurality of cut-out sections located along the rear portion of said bottom section such that said second plurality of rear cut-out sections in said top and bottom sections mate to form a second set of aperture means so that the rod portion of a rod and reel combination may pass through said first set of aperture means and the butt portion of said rod and reel combination may pass through said second set of aperture means so that said reel portion of said rod and reel combination is captured between said top and bottom sections;
   handle means attached to said front portion of said carrier apparatus for manual transportation of said apparatus; and,
   attachment means for attaching said carrier apparatus to the roof of a car,
   wherein the long axis of said rod and reel combination lies in a plane transverse to the long axis of said carrier when said rod and reel combination is captured in said carrier.

2. The apparatus of claim 1 further comprising:
   a cushion means located in said bottom section, said cushion means including a contoured cut-out portion having a contour approximately complimentary to at least part of said rod and reel combination so as to support said rod and reel combination.

3. The apparatus of claim 2 further including:
   resilient feet means attached to said bottom section for making cushioned contact between an automobile roof and said apparatus.

4. The apparatus of claim 3 wherein said attachment means comprise adjustable means for engaging the roof gutter of an automobile.

* * * * *